United States Patent
Hansen

(10) Patent No.: US 12,326,706 B2
(45) Date of Patent: Jun. 10, 2025

(54) METHOD AND SYSTEM FOR DEFINING AND CONFIGURING A HARDWARE SETUP OF A FLUID PROCESSING SYSTEM

(71) Applicant: GRUNDFOS HOLDING A/S, Bjerringbro (DK)

(72) Inventor: Jacob Hansen, Næstved (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 444 days.

(21) Appl. No.: 17/786,318

(22) PCT Filed: Dec. 16, 2020

(86) PCT No.: PCT/EP2020/086519
§ 371 (c)(1),
(2) Date: Jun. 16, 2022

(87) PCT Pub. No.: WO2021/122815
PCT Pub. Date: Jun. 24, 2021

(65) Prior Publication Data
US 2023/0025206 A1   Jan. 26, 2023

(30) Foreign Application Priority Data
Dec. 18, 2019  (EP) .................................... 19217277

(51) Int. Cl.
*G05B 19/042* (2006.01)
(52) U.S. Cl.
CPC .. *G05B 19/0426* (2013.01); *G05B 2219/2605* (2013.01)
(58) Field of Classification Search
CPC ............ G05B 19/0425; G05B 19/0426; G05B 2219/2605
USPC ......................................................... 700/282
See application file for complete search history.

(56) References Cited

U.S. PATENT DOCUMENTS

| | | | |
|---|---|---|---|
| 7,020,680 B2 * | 3/2006 | Defosse | G07F 13/065 705/28 |
| 2009/0069949 A1 * | 3/2009 | Carpenter | B67D 1/0878 222/144.5 |
| 2013/0079926 A1 * | 3/2013 | Peters | B67D 1/0041 700/238 |
| 2014/0050943 A1 | 2/2014 | Sefton | |

FOREIGN PATENT DOCUMENTS

WO   2009032942 A2   3/2009

* cited by examiner

*Primary Examiner* — Chun Cao
(74) *Attorney, Agent, or Firm* — McGlew and Tuttle, P.C.

(57) ABSTRACT

A method defines and configures a hardware setup (2) of a fluid processing system. A user input is processed (103) at a client module (15). The user input includes a set of requirement data for the fluid processing system, The set of requirement data is received (105) at a server module (17) from the client module. The server module is connected to the client module via a network (11). The hardware setup of the fluid processing system is defined (107) by a setup module based on the set of requirement data and stored catalogue data. A configuration file (25) is generated (109) by a configuration module based on the hardware setup and the set of requirement data. The hardware setup is approved (113) by the client module. The configuration file is transferred (116) to a generic control module (29) of the hardware setup for configuring the fluid processing system.

31 Claims, 3 Drawing Sheets

```
<SYSTEM>
<COMPONENT TYPE="DOSING_PUMP" ID="H">
    <CONNECTOR TYPE="BACKBONE" ID="A"/>
<COMPONENT TYPE="E_BOX" ID="I">
</COMPONENT>
<COMPONENT TYPE="T_SPLITTER" ID="B">
    <CONNECTOR TYPE="BACKBONE" ID="B1"/>
    <CONNECTOR TYPE="BACKBONE" ID="B2"/>
    <CONNECTOR TYPE="MODBUS" ID="B3"/>
</COMPONENT>
<COMPONENT TYPE="TERMINATOR" ID="D">
    <CONNECTOR TYPE="BACKBONE" ID="D1"/>
</COMPONENT>
<COMPONENT TYPE="pH Sensor" ID="K">
    <CONNECTOR TYPE="MODBUS" ID="C"/>
</COMPONENT>
<COMPONENT TYPE="CABLE" BUS_TYPE="BACKBONE" ID="C1">
    <ENDPOINT TYPE="MODBUS" ID="B3"/>
    <ENDPOINT TYPE="MODBUS" ID="C"/>
</COMPONENT>
<COMPONENT TYPE="CABLE" BUS_TYPE="BACKBONE" ID="C2">
    <ENDPOINT TYPE="BACKBONE" ID="A"/>
    <ENDPOINT TYPE="BACKBONE" ID="B1"/>
</COMPONENT>
<COMPONENT TYPE="CABLE" BUS_TYPE="BACKBONE" ID="C3">
    <ENDPOINT TYPE="BACKBONE" ID="B2"/>
    <ENDPOINT TYPE="BACKBONE" ID="D1"/>
</COMPONENT>
</SYSTEM>
```

Fig. 3b

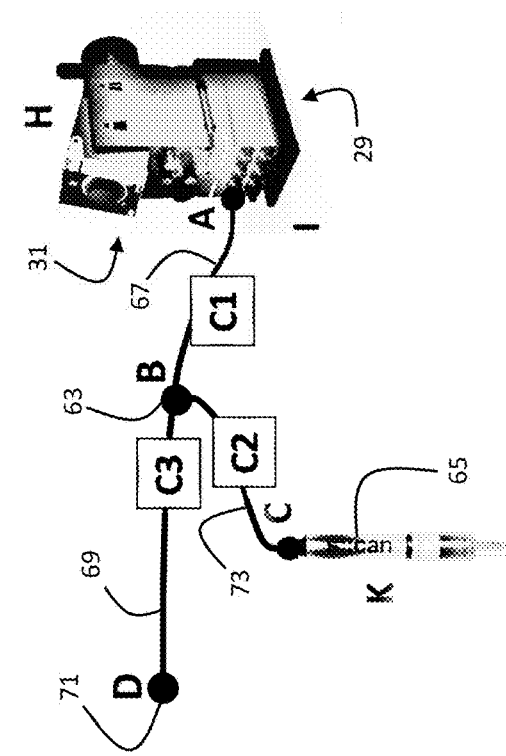

Fig. 3a

```
<CONTROLLER>
<DOSING_LOOP TYPE="PID" NAME="Disinfection">
    <P="42"/>
    <I="12"/>
    <D="45"/>
</DOSING_LOOP>
</CONTROLLER>
```

Fig. 3c

METHOD AND SYSTEM FOR DEFINING AND CONFIGURING A HARDWARE SETUP OF A FLUID PROCESSING SYSTEM

CROSS REFERENCE TO RELATED APPLICATIONS

This application is a United States National Phase Application of International Application PCT/EP2020/086519, filed Dec. 16, 2020, and claims the benefit of priority under 35 U.S.C. § 119 of European Application 19217277.3, filed Dec. 18, 2019, the entire contents of which are incorporated herein by reference.

TECHNICAL FIELD

The present disclosure is directed to a method and a system for defining and configuring a hardware setup of a fluid processing system. In particular, the present disclosure is directed to providing a software and hardware environment to facilitate setting up a water treatment system including a plurality of dosing pumps for adding chemicals and additives to a water distribution system.

TECHNICAL BACKGROUND

Setting up a fluid processing system can be a challenging and daunting task for providers of water distribution systems. Often, providers of water distribution systems only know the requirements that a water treatment system needs to fulfil, but have no information about an adequate hardware setup that could do the job. There are countless configuration options for defining a hardware setup that may include a plurality of pumps and other devices, such as sensors, mixers, valves, controllers, etc. A provider of a fluid processing system has stored catalogue data for all hardware components and is able to provide any potential hardware setup, but has no information about the requirements that a water treatment system needs to fulfil.

SUMMARY

The present disclosure provides a new method and system to bring requirement information and catalogue information together in an efficient way. Thereby, an adequate hardware setup can be defined and configured to meet the specific requirements. Furthermore, the method and system for defining and configuring a hardware setup of a fluid processing system described herein allows providing a hardware setup as a minimum viable product (MVP) that is augmentable upon user feedback. Moreover, the process of configuring the hardware setup is facilitated to reduce the risk of erroneous configurations and incorrect assembling of the hardware setup.

According to a first aspect of the present disclosure a method for defining and configuring a hardware setup of a fluid processing system is provided, wherein the method comprises the following steps:
  processing user input at a client module, wherein the user input comprises a set of requirement data for the fluid processing system,
  receiving the set of requirement data at a server module from the client module, wherein the server module is connected to the client module via a network,
  defining the hardware setup of the fluid processing system by a setup module based on the set of requirement data and stored catalogue data,
  generating a configuration file by a configuration module based on the hardware setup and the set of requirement data,
  approving the hardware setup by the client module, and
  transferring the configuration file to a generic control module being part of the hardware setup for configuring the fluid processing system.

So, a user may input requirement data at a client module, which may be implemented as an executable application on a mobile device, e.g. a smartphone or tablet. The requirement data may for instance be, at a relatively high level, "disinfection of a water flow at 500 litres per hour and continuous controlling of water values". A graphical user frontend of the client module may guide a user through a series of questions to query the set of requirement data. In particular, the requirement data may contain information about the type and scale of the tasks the fluid processing system is supposed to fulfil.

Preferably, both the server module and the client module may be part of a common software environment or virtual "eco-system" that connects different modules via a network, e.g. the internet. Based on the set of requirement data and stored catalogue data, a setup module is able to define the hardware setup, e.g. defining how many pumps of what type are needed and which kind and number of further components are needed, e.g. sensors, controllers, valves, connections, etc. The client module may be configured to display a graphic representation of the proposed hardware setup and to prompt a user to approve or decline the proposed hardware setup. In case of declining the proposed hardware setup, the user may be prompted to update and/or add requirement data to redefine the hardware setup. Once the proposed hardware setup is approved by the user, the hardware setup may be shipped to the user.

In addition to defining and shipping a customised hardware setup, the method and system described herein also facilitates the difficult task of configuring the hardware setup for adequate operation. In order to provide this, the hardware setup includes a generic control module for configuring the fluid processing system. The generic control module is preferably integrated in or attached to an electronics housing of a pump assembly of the hardware setup.

A configuration module, e.g. as part of the common software environment or virtual "eco-system", generates a configuration file based on the hardware setup and the set of requirement data. Such a configuration is then transferred to the generic control module. The transfer of the configuration file may be done before shipping the hardware setup or, preferably, after shipping upon user request. The configuration file may, for instance, comprise a connection table with address information of hardware components to ensure a proper assembling and connecting of hardware components according to the defined hardware setup.

Optionally, the method may comprise a step of receiving monitoring and performance data at a monitoring module from the generic control module via the network. Thereby, the fluid processing system can be updated or augmented by software and/or hardware upon such feedback. Furthermore, maintenance and repair intervals may be adjusted based on the received monitoring and performance data as feedback.

Optionally, the hardware setup may comprise a pump assembly, wherein the generic control module is installed in or attached to an electronics housing of the pump assembly. Preferably, the generic control module is arranged in an electronics box that is attached to the electronics housing of the pump assembly. The electronics box may have a similar shape and cross-sectional size as the electronics housing in order to allow for a space-saving and neat arrangement of electronics box and adjacent electronics housing forming at least one flush common lateral side. For instance, the electronics box and electronics housing may be stacked on top of each other.

Optionally, the hardware setup may comprise at least one sensor unit having a communication link with the generic control module, wherein the configuration file comprises sensor setup parameters associated with the at least one sensor unit. For instance, the at least one sensor unit may comprise one or more of: a flow meter, a pressure sensor, a temperature sensor, a pH-sensor, and/or another type of sensor. According to the defined hardware setup, each of the at least one sensor units may have a defined address and connection point in the hardware setup, which may be registered in the configuration file in form of a connection table. Thereby, a quick and correct assembling of the hardware setup can be ensured.

Optionally, the configuration file may comprise identification information of hardware components of the hardware setup. The identification information of hardware components may allow for an unambiguous distinction between different hardware components. The identification information may include individual product information, e.g. a series number. Thereby, the generic control module is able to check if all hardware components match with the hardware setup according to the configuration file. The generic control module may be configured to reject any non-compliant hardware component and/or output a warning about it.

Optionally, the configuration file may comprise hardware address information in a bus communication link connecting hardware components of the hardware setup. The address information of hardware components may allow for an unambiguous localisation of the different hardware components within the hardware setup. Thereby, the generic control module is able to check if all hardware components are assembled correctly within the hardware setup according to the configuration file. The generic control module may be configured to reject any incorrectly assembled hardware component and/or output a warning about it.

Optionally, the hardware setup may comprise a list of hardware components and instructions for connecting the hardware components of the hardware setup. This may facilitate the assembly process and reduces the risk of incorrect assembly.

Optionally, the requirement data may include at least one of a group of requirements, the group comprising:
water processing purpose,
type of chemicals to be dispensed or conveyed,
expected amount or flow of the fluid to be treated, and
installation parameters, in particular height differences, conduit lengths, positions of feed ports and fluid pressures.

Preferably, the requirement data only contains information available in the realm of a provider of water distribution systems. Thereby, a provider of water distribution systems as a user can be queried by the user module to retrieve the requirement data. Once the requirement data is sufficient for the setup module to make a proposal for a hardware setup, the query may be stopped.

Optionally, the step of defining the hardware setup of the fluid processing system may comprise determining the required type and/or number of pumps in the hardware setup based on a required flow of fluid to be treated. This is one of the most difficult optimisation problems to be solved for the definition of the hardware setup. The setup module may have two or more options for selecting types and/or numbers of pumps from the catalogue data to fulfil the requirements as defined by the requirement data. These options may be displayed to the user by user module for selection. The options may be ranked according to certain user preferences, such as cost or energy-consumption. Preferably, the setup module is configured to automatically select among several options based on predefined user preferences, so that the user module only displays one proposed hardware setup for user approval. The user may be able to update the user preferences via the user module.

Optionally, the configuration file may comprise controller setup parameters for customising the generic control module to a specific control module defined by the controller setup parameters. For instance, the generic control module may include a P-, I-, PI-, PD-, or PID-controller for a closed-loop control of a pump or a valve, e.g. using a control function $$u(t) = K_p e(t) + K_i \int_0^t e(t')dt' + K_d \frac{de(t)}{dt},$$

wherein u(t) is a control parameter, e.g. the pump speed or valve opening-degree, and e(t) is a time-dependent error variable representing a deviation between a setpoint value and a measured value, e.g. a setpoint temperature and a temperature measured by a temperature sensor. $K_p$, $K_i$ and/or $K_d$ are tuning co-efficients for the proportional, integral and derivative terms of the control function which depend on the specific hardware setup and desired control functionality derived from the requirement data. As the specific hardware setup and the desired control functionality is known to the configuration module at the time of generating the configuration file, the tuning coefficients $K_p$, $K_i$ and/or $K_d$ can be calculated and preset in the configuration file. So, the user does not have to tune a controller to the desired purpose anymore. Once the configuration file is transferred to the generic control module, the controller therein is specifically configured and tuned to perform the desired control functionality with the chosen hardware setup.

Optionally, the configuration file may comprise at least one of a group of operating parameters, the group comprising:
a feed pressure,
a dosage mass flow,
setpoint pressure,
setpoint flow,
setpoint temperature,
controller setup parameters,
a connection table, and
a communication and/or network parameter.

For instance, the operating parameters may be derived from the requirement data and/or a user may be queried by the user module for more specific information to be stored in the configuration file, e.g. setpoint values for pressure, flow and/or temperature. A connection table and/or other communication and network parameters may be determined by the defined hardware setup.

Optionally, the step of approving the hardware setup by the client module comprises displaying the hardware setup at the client module and receiving an approval upon the displayed hardware setup. The user may be queried for a yes/no decision and/or for a selection from a list of proposed hardware setups.

Optionally, the method may further comprise updating the configuration file upon a user command and/or in dependence of monitoring and performance data received by the monitoring module via the network from the generic control module. For instance, an update of the configuration file may be beneficial if performance data indicate a change in the pipe characteristics, e.g. due to an increased filter resistance. The controller setup parameters may then be updated. In case of a new hardware component, e.g. a sensor, added to an already assembled system, a user may command a download of a new configuration file that includes data about the new hardware component.

Optionally, the method may further comprise displaying assembly instructions for the hardware setup. This is particularly useful in order to show the user the assembly instructions for exactly the highly customised hardware setup that is to be installed. The assembly instructions may therefore be as individual as the hardware setup. The risk of a wrong assembly is thereby reduced.

Optionally, the step of defining the hardware setup may comprise providing two or more options for one or more hardware components of the hardware setup and querying a choice for the options at the client module. Preferably, an inexperienced user should not have a choice to select specific hardware components. However, a more experienced user may wish to have specific hardware components in the hardware setup. Such a selection of specific hardware components may be interpreted as requirement data for the rest of the hardware setup.

The method described above may be implemented in form of compiled or uncompiled software code that is stored on a computer readable medium with instructions for executing the method. Alternatively or in addition, the method may be executed by software in a cloud-based system, i.e. one or more of the modules of the controls system, in particular the processing module may be implemented in a cloud-based system.

According to a second aspect of the present disclosure, a system for defining and configuring a hardware setup of a fluid processing system in provided, the system comprising:
 a client module configured to process user input comprising a set of requirement data for the fluid processing system,
 a server module being connectable to the client module via a network for receiving the set of requirement data from the client module,
 a setup module configured to define the hardware setup of the fluid processing system based on the set of requirement data and stored catalogue data,
 a configuration module configured to generate a configuration file based on the hardware setup and the set of requirement data, and
 a generic control module being part of the hardware setup, wherein the generic control module is configurable by downloading the configuration file,
wherein the client module is configured to approve the hardware setup and/or to trigger transferring the configuration file to the generic control module.

Optionally, the client module may be installed on a mobile device.

Optionally, the system may further comprise a monitoring module being connectable to the generic control module via the network for receiving monitoring and performance data from the generic control module.

Optionally, the hardware setup may comprise a pump assembly, wherein the generic control module is installed in an electronics housing of the pump assembly.

Optionally, the hardware setup may comprise at least one sensor unit having a communication link with the generic control module, wherein the configuration file comprises sensor control parameters associated with the at least one sensor unit.

Optionally, the configuration file may comprise identification information of hardware components of the hardware setup.

Optionally, the configuration file may comprise hardware address information in a bus communication link connecting hardware components of the hardware setup.

Optionally, the hardware setup may comprise a list of hardware components and instructions for connecting the hardware components of the hardware setup.

Optionally, the requirement data may include at least one of a group of requirements, the group comprising:
 water processing purpose,
 type of chemicals to be dispensed or conveyed,
 expected amount or flow of the fluid to be treated, and
 installation parameters, in particular height differences, conduit lengths, positions of feed ports and fluid pressures.

Optionally, the setup module may be further configured to determine the required type and/or number of pumps in the hardware setup based on a required flow of fluid to be treated.

Optionally, the generic control module may be customisable to a specific control module based on controller setup parameters in the configuration file.

Optionally, the configuration file may comprise at least one of a group of operating parameters, the group comprising:
 a feed pressure,
 a dosage mass flow,
 setpoint pressure,
 setpoint flow,
 setpoint temperature,
 controller setup parameters,
 a connection table,
 a communication and/or network parameter.

Optionally, the client module may be configured to display the hardware setup and to receive a user approval upon displaying the hardware setup.

Optionally, the generic control module may be further configured to receive an update of the configuration file upon a user command and/or monitoring and performance data received by the monitoring module via the network from the generic control module.

Optionally, the client module may be configured to display assembly instructions for the hardware setup.

Optionally, the setup module may be further configured to provide two or more options for one or more hardware components of the hardware setup, and wherein the client module is configured to query a choice for the options.

The system described above may be implemented in form of one or more computer devices having network access to and/or comprising at least part of a common software environment or a virtual "eco-system".

The various features of the present disclosure are pointed out with particularity in the claims annexed to and forming a part of this disclosure. For a better understanding of this disclosure, its operating advantages and specific objects attained by its uses, reference is made to the accompanying drawings and descriptive matter in which preferred embodiments of the disclosure are illustrated.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIGS. 3a-c are schematic views of a simple example of a hardware setup of a fluid processing system and excerpts from a corresponding configuration file according to the present disclosure.

DESCRIPTION OF PREFERRED EMBODIMENTS

Figure 1:
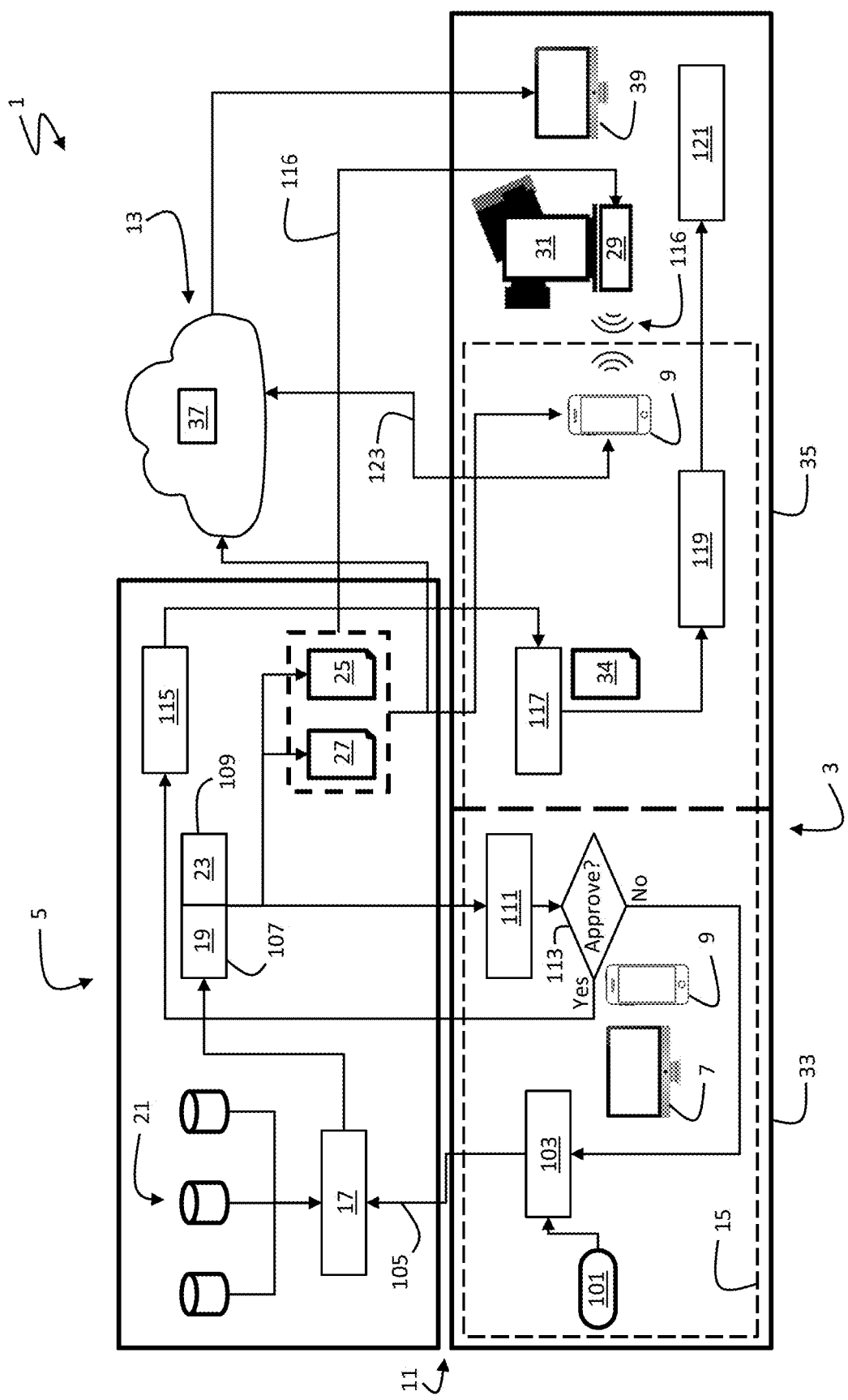
FIG. 1 is a schematic view of an example of a system for defining and configuring a hardware setup of a fluid processing system according to the present disclosure.

FIG. 1 shows a system 1 in form of a virtual "eco-system" for defining and configuring a hardware setup 2 (see FIG. 2) of a fluid processing system. The system 1 may comprise a user realm 3 and a provider realm 5. The user realm 3 may include one or more computer devices accessible by a user, such as a personal computer 7 and/or a mobile device 9, e.g. a smartphone or tablet device, connected by wire or wirelessly. The provider realm 5 may include one or more computer devices of a provider, such as a personal computer and/or a data base server. The user realm 3 and a provider realm 5 may be in communication connection via a network 11, e.g. the internet. Certain parts of the system 1 may be implemented in a network cloud 13, i.e. neither implemented in the user realm 3 nor in the provider realm 5. Such cloud-based parts 13 may be in communication connection with the user realm 3 and/or the provider realm 5 via a network 11, e.g. the internet.

The user realm 3 of the system 1 comprises a client module 15, which may be accessible by and/or implemented in an application on a PC 7 and/or mobile device 9 of a user. Having started 101 the client module 15, A user is able to use the client module 15 to formulate 103 a problem, demand or need of a fluid processing system, preferably on a fairly high level. For instance, a user may require "disinfection of a water flow of 500 litres per hour". The client module 15 may provide a text field for a user input a free query and/or provide questions, option lists and/or other guidance to formulate a query. The formulated query comprises as user input a set of requirement data for the fluid processing system.

The provider realm 5 of the system 1 comprises a server module 17 for receiving 105 the set of requirement data from the client module 15 via the network 11. Furthermore, the provider realm 5 of the system 1 comprises a setup module 19 for defining 107 the hardware setup 2 of the fluid processing system based on the set of requirement data and stored catalogue data. The catalogue data may be stored on a database 21 in the provider realm 5 of the system 1. As depicted in FIG. 1, the database 21 is connected to the server module 17 forwarding the requirement data and the catalogue data to the connected setup module 19. The provider realm 5 of the system 1 further comprises a configuration module 23 for generating 109 a configuration file 25 based on the hardware setup 2 and the set of requirement data. The server module 17, the setup module 19 and/or the configuration module 23 may be implemented as software components and/or as hardware components on at least one computer device in the provider realm 5 of the system 1. In particular, the setup module 19 and/or the configuration module 23 may be software components implemented on one computer device in the provider realm 5 of the system 1. The output of the setup module 19 may be a hardware setup in form of a "bill of materials" (BoM) 27, i.e. an order list of hardware components ready for shipping 115 to the user. The output of the configuration module 23 may be a configuration file 25.

The solution to fulfil the set of requirement data may be presented 111 to the client module 15 in the user realm 3 of the system 1 via network 11. A user may approve 113 or disapprove the proposed hardware setup by a corresponding input into the client module 15. Disapproval may lead the user to changing or adding requirement data for a redefinition of the hardware setup. Upon approval of the proposed hardware setup 2, the components of the hardware setup 2 according to the BoM 27 may be shipped 115 to the user. One of the components of the hardware setup 2 is a generic control module 29. For instance, the generic control module 29 may be installed in an electronics box that is part of or attached to a dosing pump 31 of the hardware setup 2. Before or after shipping 115 of the hardware setup 2 to the user realm 3, the configuration file 25 may be transferred 116 to the generic control module 29 for configuring the fluid processing system. Preferably, the user may receive the configuration file 25 by the client module 15 and uploads 116 the configuration file 25 to the generic control module 29 after shipping 115. Alternatively, or in addition, the generic control module 29 may be configured to download 116 the configuration file 25 from the provider realm 5 of the system 1 after shipping 115. Such a download may be triggered automatically or upon user input at the client module 15.

The user realm 3 may comprise an office section 33 and a shop floor section 35. Using the client module 15 for processing 103 the problem query and the order approval 113 may be performed in the office section 33 of the user realm 3, whereas receiving, assembling 117 and operating 119 the shipped hardware setup 2 may be performed at the shop floor section 35 of the user realm 3. Thus, at the shop floor section 35 of the user realm 3, the user may receive the shipped hardware setup 2 together with preferably customised assembly instructions 34. The assembly instructions 34 may be displayed by the client module 15 to the user. The assembly instructions 34 may be individualised and customised to user preferences editable by the user using the client module 15. The assembly instructions 34 may be tailored to the specific hardware setup 2 that was shipped 115 to the user.

Once the hardware setup 2 is assembled 117 by the user with the help of the assembly instructions 34 displayed by the client module 15, the generic control module 29 may be able to test the correct assembly by using the configuration file 25. The configuration file 25 may comprise a connection table of hardware components and/or communication and network parameter. Therefore, the generic control module 29 is able to check whether the hardware setup 2 has been correctly assembled 117, e.g. if the hardware components have been connected correctly. There is also no need for the user to configure the hardware setup 2 manually, because the configuration file 25 may comprise controller setup parameters that allow starting operation of the fluid processing system right away.

The operation 119 of the fluid processing system may be permanently, regularly or sporadically monitored 121. A cloud-based monitoring module 37 may have all information of the hardware setup 2 and the current configuration file 25 loaded at the generic control module 29. The generic control module 29 may communicate 123 performance data directly, or indirectly via the client module 15 as shown in FIG. 1, to the monitoring module 37. A user may use the client module 15 or another computer device 39 to display and/or analyse performance data. The monitoring module 37 may be configured to analyse the performance data and to compare it with requirement data set by the user via the client module 15. If certain criteria are not met anymore, e.g. due to hardware degradation, fouling, material wear, sensor failure, filter blockage or other reasons, certain maintenance, repair and/or hardware exchange actions may be proposed to the user. Depending on the severity and/or urgency of a failure or malfunctioning, the client 15 module may be configured to gain the user's attention by a visible and/or audible alarm. For minor adaptations or optimisations of the fluid processing system for improving the performance, the configuration file 25 may be updated, e.g. including new controller setup parameters. Furthermore, in case new compatible products are added to the catalogue data in the provider realm 5, such new products may be proposed to the user if better performance or further functional features can be added to the hardware setup 2. In order to prove such better performance or useful new functional features to the user, the cloud-based monitoring module 37 may analyse performance data of other systems.

Figure 2:
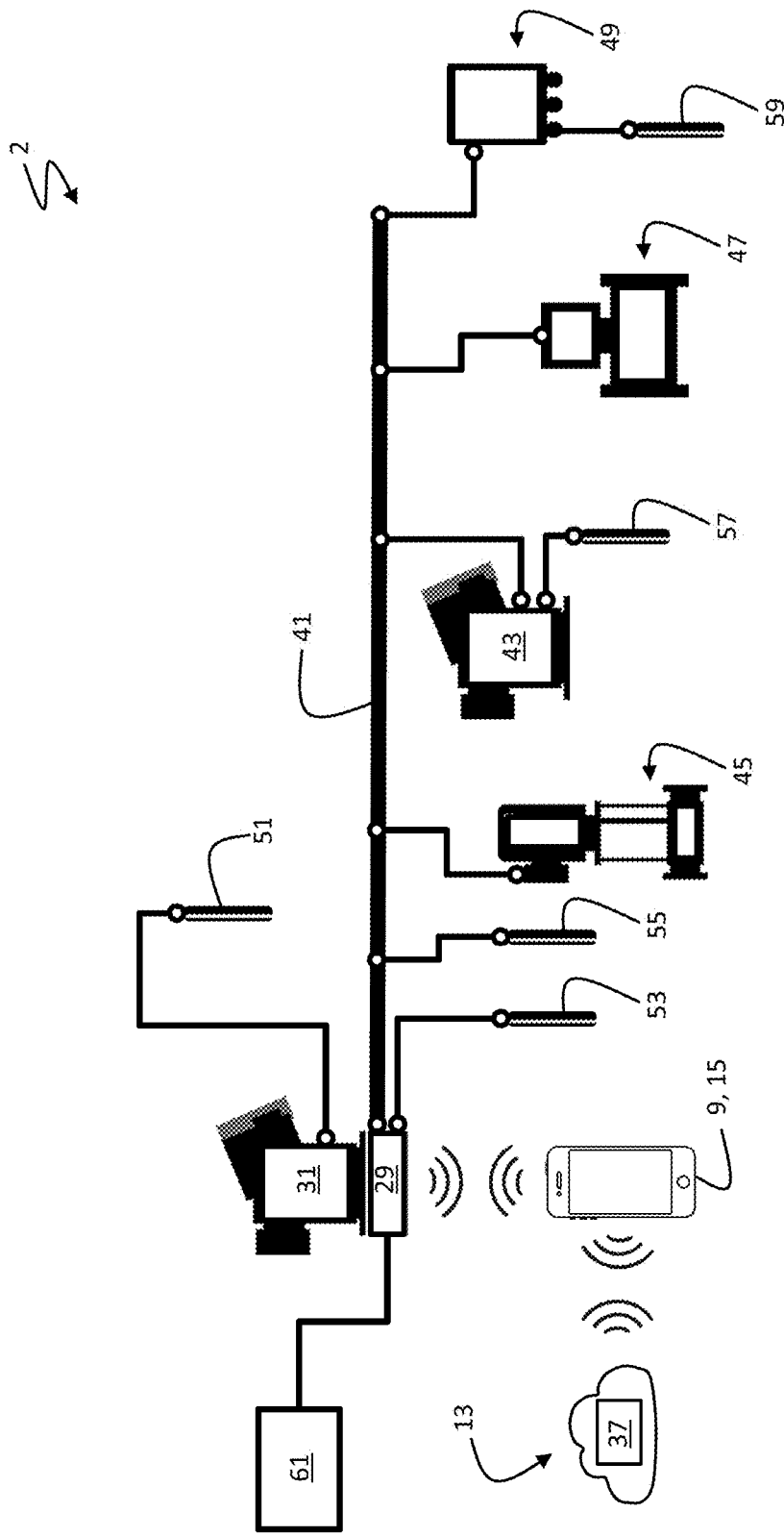
FIG. 2 is a schematic view of an example of a hardware setup of a fluid processing system according to the present disclosure.

FIG. 2 shows an example of a hardware setup 2 after assembly 117 at the shop floor section 35 in the user realm 3 of the system 1. The hardware setup 2 comprises a first dosing pump 31 comprising a control module 29 within an electronic housing arranged at a foot of the dosing pump 31. The first dosing pump 31 with the control module 29 serves as a master component for controlling a bus communication link 41 to other components of the hardware setup 2. Such other components of the hardware setup 2 include a second dosing pump 43, a circulation pump 45, a motorised valve 47, a dual pump control unit 49, and five different sensors 51, 53, 55, 57, 59. A first sensor 51, e.g. a first pressure sensor, is directly connected to the first dosing pump 31. A second sensor 53, e.g. a temperature sensor, is connected to the bus communication link 41. A fourth sensor 57, e.g. a second pressure sensor, is directly connected to the second dosing pump 43. And a fifth sensor 59, e.g. a flow meter, is directly coupled to the dual pump control unit 49. Each of the second dosing pump 43, the circulation pump 45, the motorised valve 47, and the dual pump control unit 49 is connected to the bus communication link 41.

The control module 29 is further configured to communicate with a supervisory control and data acquisition (SCADA) system 61 by using a common interface model (CIM) as a communication standard, in which data may be exchanged in an XML-format. The client module 15 on the mobile device 9, cloud-based monitoring module 37 and/or the other computer device 39 in FIG. 1 may be part of the SCADA system 61 or separate from it (as shown in FIG. 2).

FIG. 3a shows a simplified example of a hardware setup 2 to explain how the control module 29 is "aware" of the correct hardware setup 2. FIG. 3b shows the corresponding excerpt of a configuration file in a human-readable XML-format transferred 116 or downloaded 116 to the control module 29. The hardware setup 2, i.e. <SYSTEM> in FIG. 3b, comprises a dosing pump 31 identified as component type "DOSING PUMP" and identifier "H" in the configuration file. The dosing pump 31 comprises a connector "A" of the type "BACKBONE" and a component of type "E-BOX" with identifier "I". The control module 29 is installed in an electronics box, i.e. the e-box, underneath the dosage pump 31. The hardware setup 2 further comprises a component 63 of type "T-SPLITTER" with identifier "B". The T-splitter 63 has three connectors "B1", "B2" and "B3", wherein "B1" and "B2" are backbone connectors and B3 is a so-called "MOD-BUS" connector to a further hardware component with identifier "K" in form of a pH sensor 65 having a modbus connector "C". The backbone connectors "B1" and "B2" of the T-splitter 63 connect to two cable components 67, 69 of type "BACKBONE" and identifier "C1" and "C3", respectively. The two backbone cables 67, 69 form the bus communication link 41 as shown in FIG. 2. The first backbone cable 67 identified as "C1" connects the connector "A" of the dosing pump 31 with the backbone connector "B1" of the T-splitter 63, i.e. "B". The second backbone cable 69 identified as "C3" connects the backbone connector "B1" of the T-splitter 63, i.e. "B", with another hardware component in form of a terminator 71 identifier as "D" and having a backbone connector "D1". The modbus connector "C" of the pH sensor 65, i.e. "K", is connected to the modbus connector "B3" of the T-splitter 63, i.e. "B", via another hardware component in form of a "MODBUS" cable 73 identified as "C2".

If the hardware setup 2 is not exactly installed as defined by the configuration file shown in FIG. 3b, the control module 29 may realise the wrong setup and may communicate any wrong connection or hardware component to the client module 15, e.g. on the mobile device 9. Once the assembled hardware setup 2 corresponds to the configuration file shown in FIG. 3b, the control module 29 may be configured according to the controller configuration excerpt of the configuration file as shown in FIG. 3c. The closed-loop control type is here "PID" identified as "DESINFECTION". This means that the initially generic control module 29 is now specifically configured to work as a proportional-integral-derivative controller (PID) controller for disinfection. The feedback value for the closed-loop control is provided by the pH sensor 65 according to which the dosing pump 31 is closed-loop controlled to pump disinfectant into a fluid processing system. As the configuration file was generated 109 by the configuration module 23 in the provider realm 5 based on the one hand on the requirement data received 105 from the user and on the other hand on the hardware setup 2, controller setup parameters "P", "I" and "D" are preset by the configuration file to fulfil the user requirements. The user does not need to configure the controller manually or to adapt the controller setup parameters according to the specific hardware setup 2.

As already indicated in FIG. 2, the hardware setup 2 can be much more complicated than shown in FIGS. 3a-c. Correspondingly, the assembly and configuration of the hardware setup 2 can be a complex task. Therefore, the present disclosure adds significant value to a user in terms of convenience, time and effort for assembly and configuration, error reduction, maintenance, and control.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the disclosure have been shown and described in detail to illustrate the application of the principles of the disclosure, it will be understood that the disclosure may be embodied otherwise without departing from such principles.

LIST OF REFERENCE NUMERALS 1 system
2 hardware setup
3 user realm
5 provider realm
7 computer device
9 mobile device
11 network
13 network cloud
15 client module
17 server module
19 setup module
21 database
23 configuration module
25 configuration file
27 bill of materials (BoM)
29 generic control module
31 first dosing pump
33 office section
35 shop floor section
37 monitoring module
39 computer device
41 bus connection link
43 second dosage pump
45 circulation pump
47 motorised valve
49 dual pump controller
51 first sensor
53 second sensor
55 third sensor
57 fourth sensor
59 fifth sensor
61 SCADA system
63 T-splitter
65 pH sensor
67 first backbone cable
69 second backbone cable
71 terminator
73 modbus cable
101 method start
103 processing user input
105 receiving requirement data
107 defining the hardware setup
109 generating a configuration file
111 displaying the hardware setup
113 approving the hardware setup
115 shipping the hardware setup
117 assembling the hardware setup
119 operating the hardware setup
121 monitoring the hardware setup
123 receiving monitoring and performance data

The invention claimed is:

1. A method for defining and configuring a hardware setup of a fluid processing system, the method comprising:
processing a user input at a client module, wherein the user input comprises a set of requirement data for the fluid processing system;
receiving the set of requirement data at a server module from the client module, wherein the server module is connected to the client module via a network;
defining the hardware setup of the fluid processing system by a setup module based on the set of requirement data and stored catalogue data;
generating a configuration file by a configuration module based on the hardware setup and the set of requirement data;
approving the hardware setup by the client module; and
transferring the configuration file to a generic control module that is part of the hardware setup for configuring the fluid processing system.

2. The method according to claim 1, further comprising receiving monitoring and performance data at a monitoring module from the generic control module via the network.

3. The method according to claim 1, wherein the hardware setup comprises a pump assembly, wherein the generic control module is installed in an electronics housing of the pump assembly.

4. The method according to claim 1, wherein the hardware setup comprises at least one sensor unit having a communication link with the generic control module, wherein the configuration file comprises sensor setup parameters associated with the at least one sensor unit.

5. The method according to claim 1, wherein the configuration file comprises identification information of hardware components of the hardware setup.

6. The method according to claim 1, wherein the configuration file comprises hardware address information in a bus communication link connecting hardware components of the hardware setup.

7. The method according to claim 1, wherein the hardware setup comprises a list of hardware components and instructions for connecting the hardware components of the hardware setup.

8. The method according to claim 1, wherein the requirement data includes at least one of a group of requirements, the group comprising:
a water processing purpose;

a type of chemicals to be dispensed or conveyed;
an expected amount or flow of the fluid to be treated; and
one or more installation parameters, in particular height differences, conduit lengths, positions of feed ports and fluid pressures.

9. The method according to claim 1, wherein the hardware setup of the fluid processing system comprises determining the required type and/or number of pumps in the hardware setup based on a required flow of fluid to be treated.

10. The method according to claim 1, wherein the configuration file comprises controller setup parameters for customizing the generic control module to a specific control module defined by the controller setup parameters.

11. The method according to claim 1, wherein the configuration file comprises at least one of a group of operating parameters, the group comprising:
a feed pressure;
a dosage mass flow;
setpoint pressure;
setpoint flow;
setpoint temperature;
controller setup parameters;
a connection table; and
a communication and/or network parameter.

12. The method according to claim 1, wherein approving the hardware setup by the client module comprises displaying the hardware setup at the client module and receiving an approval upon the displayed hardware setup.

13. The method according to claim 1, further comprising updating the configuration file upon a user command and/or in dependence of monitoring and performance data received by the monitoring module via the network from the generic control module.

14. The method according to claim 1, further comprising displaying assembly instructions for the hardware setup.

15. The method according to claim 1, wherein defining the hardware setup comprises providing two or more options for one or more hardware components of the hardware setup and querying a choice for the options at the client module.

16. A system for defining and configuring a hardware setup of a fluid processing system, comprising:
a client module configured to process user input comprising a set of requirement data for the fluid processing system;
a server module which is connectable to the client module via a network for receiving the set of requirement data from the client module;
a setup module configured to define the hardware setup of the fluid processing system based on the set of requirement data and stored catalogue data;
a configuration module configured to generate a configuration file based on the hardware setup and the set of requirement data; and
a generic control module which is part of the hardware setup, wherein the generic control module is configurable by downloading the configuration file,
wherein the client module is configured to approve the hardware setup and/or to trigger transferring the configuration file to the generic control module.

17. The system according to claim 16, wherein the client module is installed on a mobile device.

18. The system according to claim 16, further comprising a monitoring module which is connectable to the generic control module via the network for receiving monitoring and performance data from the generic control module.

19. The system according to claim 16, wherein the hardware setup comprises a pump assembly, wherein the generic control module is installed in an electronics housing of the pump assembly.

20. The system according to claim 16, wherein the hardware setup comprises at least one sensor unit having a communication link with the generic control module, wherein the configuration file comprises sensor control parameters associated with the at least one sensor unit.

21. The system according to claim 16, wherein the configuration file comprises identification information of hardware components of the hardware setup.

22. The system according to claim 16, wherein the configuration file comprises hardware address information in a bus communication link connecting hardware components of the hardware setup.

23. The system according to claim 16, wherein the hardware setup comprises a list of hardware components and instructions for connecting the hardware components of the hardware setup.

24. The system according to claim 16, wherein the requirement data includes at least one of a group of requirements, the group comprising:
water processing purpose;
type of chemicals to be dispensed or conveyed;
expected amount or flow of the fluid to be treated; and
installation parameters, comprising one or more of height differences, conduit lengths, positions of feed ports and fluid pressures.

25. The system according to claim 16, wherein the setup module is further configured to determine the required type and/or number of pumps in the hardware setup based on a required flow of fluid to be treated.

26. The system according to claim 16, wherein the generic control module is customizable to a specific control module based on controller setup parameters in the configuration file.

27. The system according to claim 16, wherein the configuration file comprises at least one of a group of operating parameters, the group comprising:
a feed pressure;
a dosage mass flow;
setpoint pressure;
setpoint flow;
setpoint temperature;
controller setup parameters;
a connection table; and
a communication and/or network parameter.

28. The system according to claim 16, wherein the client module is configured to display the hardware setup and to receive a user approval upon displaying the hardware setup.

29. The system according to claim 16, wherein the generic control module is further configured to receive an update of the configuration file upon a user command and/or monitoring and performance data received by the monitoring module via the network from the generic control module.

30. The system according to claim 16, wherein the client module is configured to display assembly instructions for the hardware setup.

31. The system according to claim 16, wherein the setup module is further configured to provide two or more options for one or more hardware components of the hardware setup, and wherein the client module is configured to query a choice for the options.

* * * * *